UNITED STATES PATENT OFFICE.

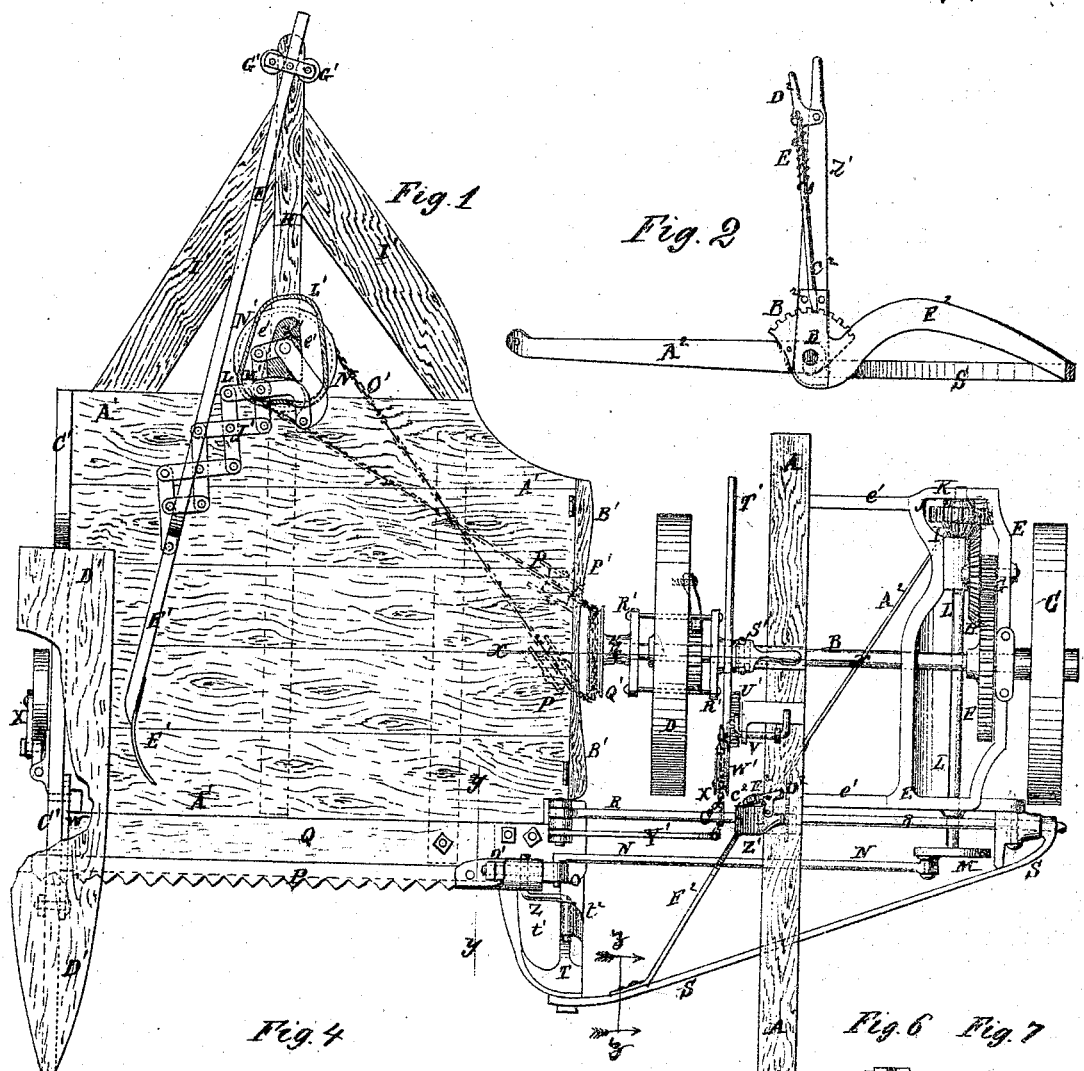

HARRY H. BRIDENTHALL, JR., OF NEW DERRY, PENNSYLVANIA.

IMPROVEMENT IN HARVESTERS.

Specification forming part of Letters Patent No. 120,027, dated October 17, 1871.

*To all whom it may concern:*

Be it known that I, HARRY H. BRIDENTHALL, Jr., of New Derry, in the county of Westmoreland and State of Pennsylvania, have invented a new and useful Improvement in Harvesters and Mowers; and I do hereby declare that the following is a full, clear, and exact description thereof, which will enable others skilled in the art to make and use the same, reference being had to the accompanying drawing forming part of this specification.

Figure 1 is a top view of my improved machine, adjusted as a harvester, parts being broken away and removed to show the construction. Fig. 2 is a detail view of the device for rocking the finger-bar, partly in section, through the line $z\ z$, Fig. 1. Fig. 3 is a detail sectional view of the device for throwing the raking device into and out of gear with the inner drive-wheel, taken through the line $x\ x$, Fig. 1. Fig. 4 is a detail sectional view, taken through the line $y\ y$, Fig. 1, when the machine is adjusted as a mower. Fig. 5 is a detail view of the wheel for supporting the inner end of the finger-bar when the machine is adjusted as a mower. Fig. 6 is a detail top view of the shoe for supporting the outer end of the finger-bar when the machine is adjusted as a mower. Fig. 7 is a detail side view of the same.

My invention has for its object to improve the construction of harvesters and mowers, so as to make them more convenient in use and more effective in operation, causing the cut grain to be deposited in gavels at such a distance from the standing grain as to be out of the way of the machine in its next round; and it consists in the construction and combination of various parts of the machine, as hereinafter more fully described and specifically claimed.

A is the tongue, on the under side of which is a bearing for the driving-shaft B. C is the outer driving-wheel, which is rigidly attached to the driving-shaft B, or connected with said driving-shaft by a pawl and ratchet-wheel or other clutch, so as to carry the said shaft with it in its forward revolution. D is the inner driving-wheel, which revolves upon the inner part of the driving-shaft B, with which it is connected by a pawl and ratchet-wheel or other clutch. The inner drive-wheel D is made somewhat larger than the outer drive-wheel C, which throws the work of driving the cutters mainly upon the outer wheel, and thus counteracts the side draft of the machine. E is a box for receiving and protecting the gearing for driving the cutter-bar, and which is rigidly connected with the tongue A by arms $e'$, cast solid upon said box E. The box E has also lugs cast upon it to receive the rods and bars, hereinafter described. To the driving-shaft B, within the box E, is attached a large gear-wheel, F, the teeth of which mesh into the teeth of the small gear-wheel G, pivoted within and to the box E, and with which is rigidly connected a large bevel-gear wheel, H. The teeth of the large bevel-gear wheel H mesh into the teeth of the small bevel-gear wheel I, which is pivoted to and within the box E, and with which is rigidly connected a large gear-wheel, J, the teeth of which mesh into a small gear-wheel, K, attached to the shaft L. The shaft L revolves in bearings in the box E, and to its forward end, which projects at the forward end of the box E, is attached a small crank-wheel, M, to the crank-pin of which is pivoted the outer end of the pitman N. The inner end of the pitman N is bent at right angles to form a pivot which enters the eye of the eye-bolt O, which passes through a lug formed upon the inner end of the cutter-bar P, where it is secured in place by two lock-nuts, $o'$, so that the cutter-bar P can rock with the finger-bar Q without twisting the said pitman N. The inner end of the finger-bar Q is hinged to the inner end of the bar or rod R, so that the finger-bar can be turned up or raised and lowered freely. The outer end of the bar or rod R is pivoted to a lug formed upon the forward end of the box E, so that the finger-bar can be rocked without twisting the said bar or rod R. The finger-bar Q is braced in position at right angles with the line of draft by means of the brace-bar or rod S, the outer end of which is pivoted to the outer end of the rod or bar R, and the outer part of which rests against a rounded projection formed upon the lug which forms the bearing for the said rod or bar R. The inner end of the brace S is pivoted to the forward part of the shoe T, to which the inner end of the finger-bar Q is attached. The shoe T is made with an opening, $t^1$, to receive the wheel U which supports the inner end of the finger-bar Q, when the machine is adjusted as a mower. The shoe T is also made with an upward-projecting slotted arm, $t^2$, to which the standard V or the wheel U is bolted, so that the wheel U can be conveniently raised and lowered to adjust the machine for cutting the grass lower or higher, as may be desired. To the outer end of the finger-bar Q is attached or upon it is formed a cross-head, W, to which the adjustable caster-wheel X is bolted when the machine is adjusted as a harvester, and to which the shoe Y is bolted when the machine is adjusted as a mower. The lugs of the shoe Y are made with vertical slots to receive the bolts, so that the outer end of the finger-bar Q can be conveniently adjusted higher or lower, to correspond with the adjustment of the wheel U V when the grass is to be cut lower or higher. To the upper end of the upright arm $t^2$ of the shoe T is pivoted with a long bearing the upper end of the rod Z, the lower end of which is pivoted also with a long bearing to the inner end of the cutter-bar P, to support the inner end of said bar in its movements, thus avoiding the slide usually used, and the consequent friction. $A^1$ is the platform, which is securely but detachably bolted to the finger-bar Q. To the inner end of the platform $A^1$ is hinged the lower edge of a board, $B^1$, which serves as a stop to the grain and rake, and along which the gavel is drawn by the rake in dropping it to the ground. Hinging the board $B^1$ at its lower edge prevents it from being broken, when the outer end of the platform $A^1$ is raised for passing obstructions, or for passing from place to place. To the outer end of the platform $A^1$ is attached the grain-divider $C^1$, which has a guard-board, $D^1$, attached to its upper edge, beneath which the rake moves forward, and which protects said rake from the falling grain while moving forward. $E^1$ is the rake-head, the handle $F^1$ of which is made flat, and passes between two rollers, G', pivoted to a bracket attached to an arm, H', projecting to the rearward from the platform $A^1$, and strengthened by braces I'. To the forward part of the handle $F^1$ is pivoted the forward end of a lazy-tongs, J', the rear end of which is attached to the upper end of a short vertical shaft, K', which works in bearings in the arm H', a little in the rear of the rear edge of the platform $A^1$. The shaft K' passes through a plate, L', attached to the upper side of the said arm H', and in the upper side of which is formed a groove, $l'$, to receive a pin or friction-pulley, M'. The groove $l'$ is so curved as to expand and contract the lazy-tongs J', and guide the rake as it collects the gavel against the hinged board $B^1$; draws it back along said board to drop it to the ground; moves back across the rear part of the platform $A^1$, and forward beneath the guard-board $D^1$, ready to collect another gavel when sufficient cut grain has fallen upon the said platform $A^1$; the lazy-tongs J' thus acting as an extension-crank, and the friction-rollers G' serving as a fulcrum to the rake $E^1 F^1$. To the lower end of the shaft K' is attached a grooved-pulley, N', around which passes a chain, O', which passes beneath the friction-pulleys P' attached to the lower side of the inner end of the platform $A^1$, and around the grooved-pulley Q' which runs loosely upon the inner end of the shaft B. The chain O' thus supports the inner end of the platform $A^1$, and is kept taut by the weight of the said end of the said platform. R' is a clutch, through which the shaft B passes, and the side bars of which pass through and slide in eyes or lugs $a'$ formed upon or attached to the spokes or hub of the inner drive-wheel D. With the inner part of the clutch R' is connected a bent foot-lever, S', which is pivoted to the tongue A so that the driver with his foot can conveniently throw the wheel D into and out of gear with the pulley Q' that drives the raking device. T' is a lever, pivoted to the tongue A. To the rear lower part of the lever T' is attached a segmental ratchet-wheel, U', upon the teeth of which the engaging end of the lever-pawl V' takes hold to hold the lever T' securely in any position into which it may be adjusted. To the forward side of the lower part of the lever T' is attached a segmental grooved pulley, W', to which is attached a chain, X', one end of which is connected with the bar or rod R. The other part of the chain X' passes beneath the rod or bar R, and its end is attached to the end of the lever Y'. The other end of the lever Y' is pivoted to the inner end of the finger-bar Q in such a way that the outer end of said bar may be raised freely, but the free end of the lever Y' cannot move downward without raising the finger-bar Q and platform $A^1$. By this construction, by moving the upper end of the lever T' to the rearward, the platform $A^1$, finger-bar Q, and bar R, can be raised for passing over obstructions or for traveling short distances. Z' is a lever, the lower end of which is pivoted to the rod R. $A^2$ is a brace-bar, the rear end of which is connected with the rear end of the box E, and its forward end is pivoted to the rod R. To the forward part of the brace $A^2$ is rigidly attached a segmental ratchet-wheel, $B^2$, upon the teeth of which the lower end of the pawl $C^2$ takes hold to hold the lever Z' securely in any position into which it may be adjusted. The upper end of the pawl $C^2$ is pivoted to the angle of a short bent lever, $D^2$, which is pivoted to the upper part of the lever Z', so that by operating the said lever $D^2$ the pawl $C^2$ may be raised from the teeth of the ratchet $B^2$. The pawl $C^2$ is held down upon the ratchet $B^2$ by a spring, $E^2$, as shown in Fig. 2. $F^2$ is a bar, the rear part of which is pivoted to the bar R, and its rear end is rigidly attached to the lower part of lever Z'. The forward end of the bar $F^2$ is rigidly attached to the bar S, as shown in Fig. 1. By this construction, by operating the lever Z', the finger-bar Q and cutter-bar P can be rocked to turn the fingers downward for cutting grain or grass that may be lying down, or upward, to pass low obstructions.

Having thus described my invention, I claim as new and desire to secure by Letters Patent—

1. The combination of the rake $E^1 F^1$, lazy-tongs J', shaft K', grooved guide-plate L' $l'$, guide-pin or roller M', pulley N', chain O', guide-pulleys P', and pulley Q', with each other, and with the platform $A^1$ and driving-shaft B, substantially as herein described and for the purpose set forth.

2. The combination of the clutch R' $a'$, constructed as described, and foot-lever S', with the tongue A, shaft B, driving-wheel D, and pulley Q', for the purpose of throwing said wheel D and pulley Q' into and out of gear with each other, substantially as herein shown and described and for the purpose set forth.

3. The arrangement of the bars R S, the pivoted bar $F^2$, and arm $A^2$, with the finger-bar Q, shoe T, and box E, substantially as herein shown and described, and for the purpose set forth.

4. The combination of the lever Z', arm $A^2$, pawl $C^2$ $D^2$ $E^2$, segmental ratchet-wheel $B^2$, and bar or lever $F^2$, with the bars R S, substantially as herein shown and described, and for the purpose set forth.

5. The combination of the lever T', ratchet U', pawl V', segmental pulley W', chain X', and lever Y', with each other, with the tongue A, bar R, and finger-bar Q, substantially as herein shown and described, and for the purpose set forth.

HARRY H. BRIDENTHALL, JR.

Witnesses:
FRANK HORNER,
WILLIAM COVER. (74)